United States Patent
Innes

(10) Patent No.: US 7,191,218 B1
(45) Date of Patent: Mar. 13, 2007

(54) DATABASE SYNCHRONIZATION FOR MOBILE COMPUTING DEVICES

(75) Inventor: Brian Innes, Ferndown (GB)

(73) Assignee: International Business Machines Corporation, Armonk, NY (US)

( * ) Notice: Subject to any disclaimer, the term of this patent is extended or adjusted under 35 U.S.C. 154(b) by 1215 days.

(21) Appl. No.: 09/613,407

(22) Filed: Jul. 11, 2000

(30) Foreign Application Priority Data

Feb. 24, 2000 (GB) ................................. 0004327.3

(51) Int. Cl.
*G06F 15/16* (2006.01)
(52) U.S. Cl. .................. 709/206; 709/223; 709/224; 379/100; 379/88
(58) Field of Classification Search ............... 709/219, 709/245, 217, 206, 203, 223, 224
See application file for complete search history.

(56) References Cited

U.S. PATENT DOCUMENTS

| | | | |
|---|---|---|---|
| 5,931,905 A * | 8/1999 | Hashimoto | 709/217 |
| 5,961,590 A * | 10/1999 | Mendez et al. | 709/206 |
| 6,018,762 A | 1/2000 | Brunson et al. | |
| 6,381,651 B1 * | 4/2002 | Nishio et al. | 709/245 |
| 2002/0046299 A1 * | 4/2002 | Lefeber et al. | 709/318 |

FOREIGN PATENT DOCUMENTS

| | | |
|---|---|---|
| EP | 1014629 A2 | 6/2000 |
| GB | 2319431 A | 5/1998 |
| GB | 2347308 A | 8/2000 |
| JP | 9321792 | 12/1997 |
| JP | 1106883 | 3/1999 |
| JP | 1114601 | 5/1999 |
| JP | 1125216 | 9/1999 |

* cited by examiner

*Primary Examiner*—Jason Cardone
*Assistant Examiner*—Adnan M. Mirza
(74) *Attorney, Agent, or Firm*—Yee & Associates, P.C.; Jerry W. Herndon

(57) ABSTRACT

The invention relates to performing server initiated database synchronisation between a mail server 10 and a client on a mobile computing device 70. Both the mail server and the client are provided with a copy of a user mailbox 40, 40A. When a message for that user is received at the mail server, this is stored in their server mailbox. The mail server then initiates a link with the client and prompts it to dial into the mail server in order to synchronise its local copy of the mailbox with the server copy. In this manner new mail is automatically transferred to the client device upon receipt at the mail server.

22 Claims, 7 Drawing Sheets

DATABASE SYNCHRONIZATION FOR MOBILE COMPUTING DEVICES

FIELD OF THE INVENTION

The invention relates generally to database synchronisation for mobile computing devices and in particular to server initiated database synchronisation with a client machine.

BACKGROUND OF THE INVENTION

Client/Server distributed computing environments are well known in the art. A central server system, comprising one or more servers, running a plurality of applications, is provided. Multiple client machines may connect to the system in order to retrieve data from one or more of its servers. The clients are physically separate from the server, running their own operating system. Clients typically communicate with the server system via an asynchronous connection using a standard comms protocol such as TCP/IP.

It is common for such a system to include a mail server running database application software with email capability such as Lotus Notes, available from the IBM Corporation. The mail server is responsible for receiving the electronic mail addressed to all users registered with it.

Typically the database software comprises a mail database including multiple mailboxes. Each registered user owns one of these mailboxes and mail arriving at the server is automatically deposited in the appropriate box. Each client machine runs software (eg Lotus Notes) allowing a user to access mail, work with it, and to compose their own emails. Such software may also provide added functionality, for example a calendar, an address book etc.

Co-pending European patent application number 97300435.1 (IBM docket number UK9-96-015) is primarily concerned with voice mail and discloses a Java applet running on a client machine with an Internet connection to a mail server. The applet continually polls the server to see whether any mail has been received for that machine. Upon receipt of mail at the server, the client's applet detects this and notifies the user of the new message. The application also suggests that it might be possible for the server to initiate such mail notification. In any event, after such notification it is then the responsibility of the user to contact the server to access the new message.

It is also known that mobile phones are often capable of receiving SMS text messages. These are automatically transferred by a messaging server to the appropriate phone. This functionality, however, is provided as part of the network infrastructure and so is limited to phones supported by and within the geographical range of that infrastructure. It is generally suitable for short text messages only, otherwise the network protocol becomes too complex. The SMS may not be compatible with other mailboxes from different applications belonging to the user.

One problem with the simple client/server model described above is that if the server is particularly busy or the network congested then response times can become unacceptably poor. Users reliant on accessing the server's mail database in order to work with their mail can be frustrated by the amount of time they waste whilst waiting for operations to complete.

One solution supported by some email programs such as Lotus Notes is for each user to store a copy of their mail database on their local machine. A user manipulates their mail locally and only connects to the server in order to send and receive mail. Thus improved response times are observed. Any changes made to the server copy of the user's mailbox have to be reflected in their local mail database and vice versa. Updates have to be performed and any conflicts resolved. Thus when mail is received at the server, this change has to be replicated across to the corresponding user's local mail database (ie synchronisation performed). Likewise when a user sends mail or updates their calendar/address book, the changes have to be reflected at the server-end. The software enabling a user to synchronise (ie replicate) their local database with the server's mailbox is generally part of the functionality of the email application itself (as with Lotus Notes).

Lotus Notes permits automated replication to be scheduled to occur with the server at a predetermined frequency. If there is new mail, the user is informed by means of an alert message "you have new mail" which appears as a popup message. This message is received as a result of the client machine polling the server at a predetermined frequency. In this system, if a user is waiting for an important piece of mail it is necessary for them to continually connect to the server either for direct access or by repeated replication, or to set a high polling frequency.

Further problems exist where the local copy of the database is maintained on a mobile computing device. Such devices may include personal digital assistants (PDAs), palmtops, notepads, laptop computers and mobile phones with advanced computational facilities. Such devices have no fixed connection to the server, and so have to specifically dialup the server in order to synchronise their local copy with the corresponding mailbox held on the server and then disconnect.

Thus a user of one of these mobile computing devices who is expecting an important piece of mail may have to dial up numerous times within a short period of time in order to replicate with the server. Often there will be no new mail and thus such a replication will result in no change to the local copy of the mail. Repeated replication is distracting and invariably proves a waste of time and resources.

DISCLOSURE OF THE INVENTION

Accordingly the invention provides a method for performing server initiated database synchronisation between a mail server and a client on a mobile computing device, comprising the steps of: providing the mail server and the client each with a copy of a user mailbox; receiving a message for said user at said mail server; storing the message in said user mailbox on said mail server; responsive to receipt of said message at the mail server, initiating a link between said mail server and said client; and synchronising the client copy of said mailbox with the mail server copy such that said message is added to the client copy of the mailbox.

The use of pervasive devices, for example palmtops, notebooks, notepads, laptops, personal digital assistants (PDAs) and intelligent mobile phones, is on the increase. Such remote mobile devices are frequently used to retrieve mail from a mail server, however they have no fixed connection to that mail server. Rather than a user having to specifically dialup the server in order to synchronise their local mailbox and then disconnect, in accordance with the present invention it is the server which initiates communications with the client. Time is not wasted repeatedly dialing up the server just in case a new piece of mail has arrived. Expense is also minimised and network traffic reduced. Urgent data is received at a client device automatically and in a timely manner, without having to wait for the next time the client connects.

According to a preferred embodiment, the mail server copy of the mailbox includes a remote device id for identifying the client. The mail server contacts the client via an intermediary message server which includes an address book containing the remote device id of the client and its corresponding contact details (ie a telephone number). The client is able to update the telephone number and this allows the client device to use whatever telephony facilities happen to be available locally (for example, a laptop with modem may be connected to a conventional telephone line in any given office). The message server acts as a generic routing mechanism and may either be totally separate from the mail server or the two may be combined, depending on respective system loads, application management considerations, physical location of computing resources, etc.

In the preferred embodiment, the connection with the client is initiated via an agent, running on the mail server, using the remote device id. The agent creates a trigger message including the remote id and transmits this to the message server. The message server is then responsible for looking up the remote id within its address book and obtaining this to the corresponding address of the client device. This address is subsequently used by the message server to transmit a second trigger message to the client causing the client to initiate a link with that message server. The message server then sends a synchronisation request over this link and receipt of such a request at the client causes it perform mail database synchronisation. Once the second trigger message has caused the client to establish a link with the message server, that link may be used to send further requests to the client. These may prompt the client to perform any number of tasks. Note that this link will typically be into a general portal for a company network (intranet), thereby allowing the client machine to make direct contact with both the message server and the mail server over this network. The reason for this approach is that certain remote mobile devices do not support receipt of high-level protocol inbound calls. In one preferred embodiment, the client device is initially contacted via a serial link and it can then set up a second call, this time outbound, in order to provide a high-level protocol communications session (eg a TCP/IP session) with the mail and message server. This solution enables the client device to make use of commercially available software in order to perform the synchronisation using a TCP/IP session.

It will be appreciated that in other embodiments only a single link between the client and server may be required, where synchronisation can easily be performed over the initial inbound link to the client. Of course, if the message server and mail server are not both contactable through the same network portal, then again separate links may be required to first receive the trigger message, and secondly to perform the synchronisation (unless the message server becomes directly involved in the synchronisation process itself, although this would probably represent a more complicated approach).

In an alternative embodiment the caller id of a known server, with respect to an incoming call, can be used effectively as the second trigger message to prompt the client to initiate synchronisation with the mail server. It is also possible for the server to use an SMS message to the client to prompt the synchronisation. This has the added advantage that such messages will be queued if the remote device is switched off for future delivery.

It will be appreciated that the use of the message server in the preferred embodiment is architecturally convenient, to provide a platform which also supports more general messaging with the PDA. However, in some embodiments it may be preferable to roll up the functionality of the message server into the agent on the mail server, or even into the standard operation of the mail database system itself.

According to the preferred embodiment, it is possible for a user to disable server initiated database synchronisation with the client by transmitting a null device id to the mail server, although other approaches, such as setting a simple flag, could also be used. It is also possible to log when synchronisation was last performed so that it is not performed again for a predetermined amount of time. Preferably the user is able to modify this setting. This is beneficial since a user may receive a batch of mail, each message arriving within minutes of the next. It is costly and distracting, not to mention a waste of resources, for the client to synchronise with the mail server receipt of each piece of mail at that server.

The invention further provides a mail server for initiating database synchronisation with a client on a mobile computing device, comprising:

a mail server copy of a user mailbox, wherein a copy of said user mailbox also exists on the client;

means for receiving a message for said user at the mail server;

means for storing the message in said user mailbox on the mail server; means, responsive to receipt of said message at the mail server, for initiating a link between the mail server and the client; and means for transmitting synchronisation updates to the client in order to synchronise the client copy of said mailbox with the mail server copy, such that said message is added to the client copy of the mailbox.

The invention further provides a mobile computing device including a copy of a user mailbox, wherein said copy corresponds to a user mailbox on a mail server, sa-id server performing server initiated database synchronisation upon receipt of a message for the user at said mail server, said device comprising:

means for detecting a call from the mail server;

means, responsive to detecting said call, for initiating a link with the mail server; and means for receiving synchronisation updates from the mail server in order to synchronise the client copy of said mailbox with the mail server copy such that said message is added to the client copy of the mailbox.

BRIEF DESCRIPTION OF THE DRAWINGS

A preferred embodiment of the present invention will now be described in detail, by way of example only, and with reference to the following drawings.

DESCRIPTION OF THE PREFERRED EMBODIMENTS

Figure 1:
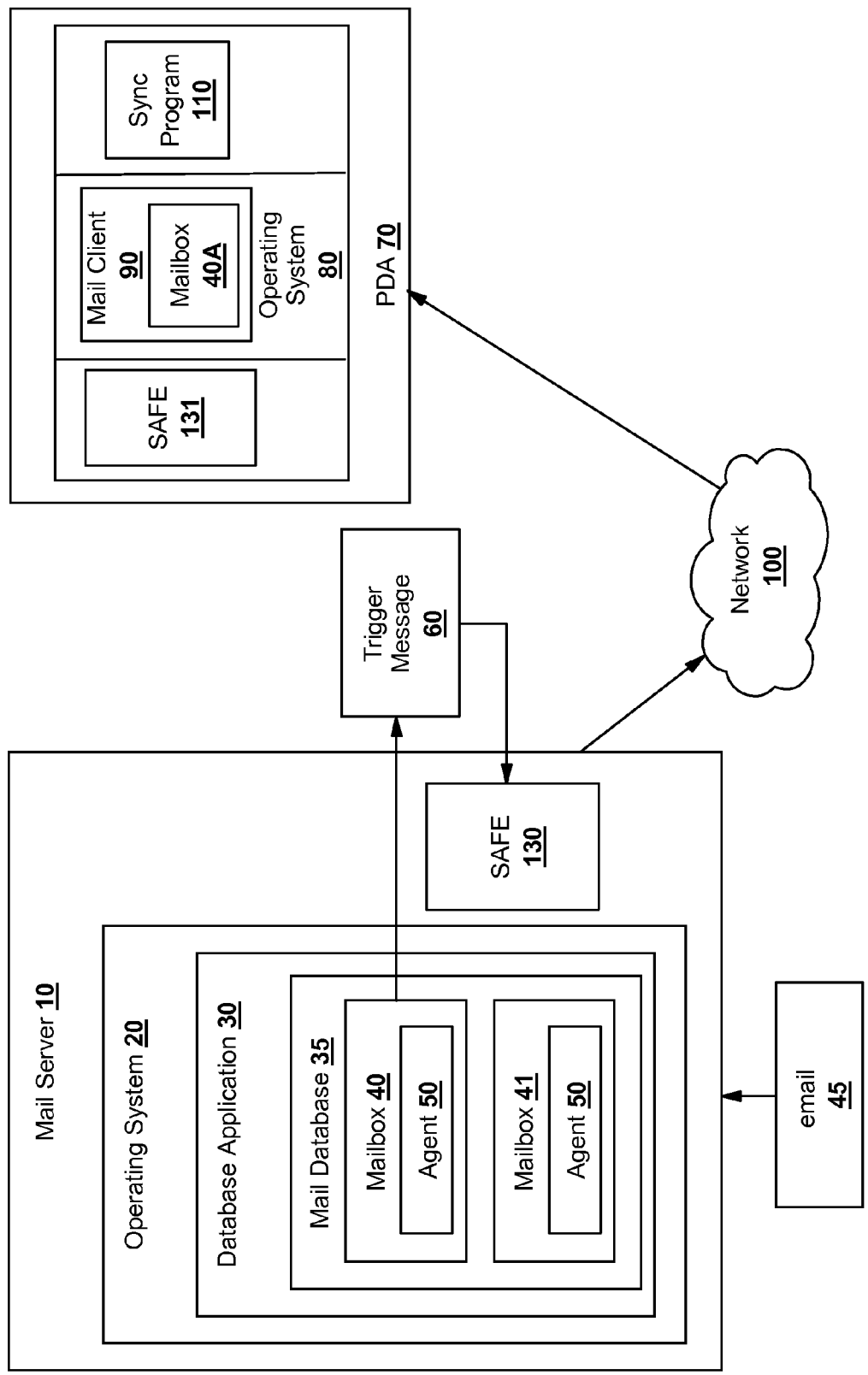
FIG. 1 is a high level diagram of the operating environment of a preferred embodiment of the invention.

With reference to FIG. 1, a server 10, runs an operating system 20. According to the preferred embodiment, the server sits within an enterprise network and can, for example, be from the IBM RISC System/6000 family, running in conjunction with the IBM AIX operating system.

On top of the operating system runs database application software 30. In the example, this is Lotus Notes, available from the IBM Corporation. Within the Lotus Notes environment sits a mail database 35, comprising a plurality of mailboxes (two shown) 40, 41. Each mailbox is associated with a particular user. Upon receipt of an email 45 by server 10, the email 45 is then transferred to the mailbox belonging to the user to whom the email is addressed (in this case mailbox 40).

Each Lotus Notes mailbox is based upon a standard definable template. It is possible to modify the base template definition and any changes are then inherited by all mailboxes. According to the preferred embodiment, the template is such that an agent (small program or macro) is run upon receipt of each mail message, and also includes a mailbox preference to allow a user, owning that box, to complete a field (not shown) indicating a remote mobile computer device. The agent 50 is responsible for creating a trigger message 60 for transmittal across a network 100 to the specified mobile computer device 70. A SAFE application 130 (communications software) also runs on the mail server and the agent passes the trigger message to SAFE which then arranges for the transmittal across the network 100. The network may be, for example, a mobile telephone network or the Public Switched Telephone Network (PSTN) etc, and in one preferred embodiment the mobile computer device is a personal digital assistant (eg a Psion Netbook, available from Psion PLC). Note, the PDA does not have a permanent connection to the server 10.

The PDA also runs a SAFE application 131 to receive the trigger message and an operating system 80, which in the preferred embodiment is EPOC from the Symbian Corporation. The operating system includes a mail client 90, with a mail box 40A. The mail box 40A is the PDA user's copy of the mailbox 40 sitting on the server 10. The PDA also includes mail synchronisation software 110 which when activated dials up the server and performs synchronisation, as will be described in more detail below.

Figure 2:
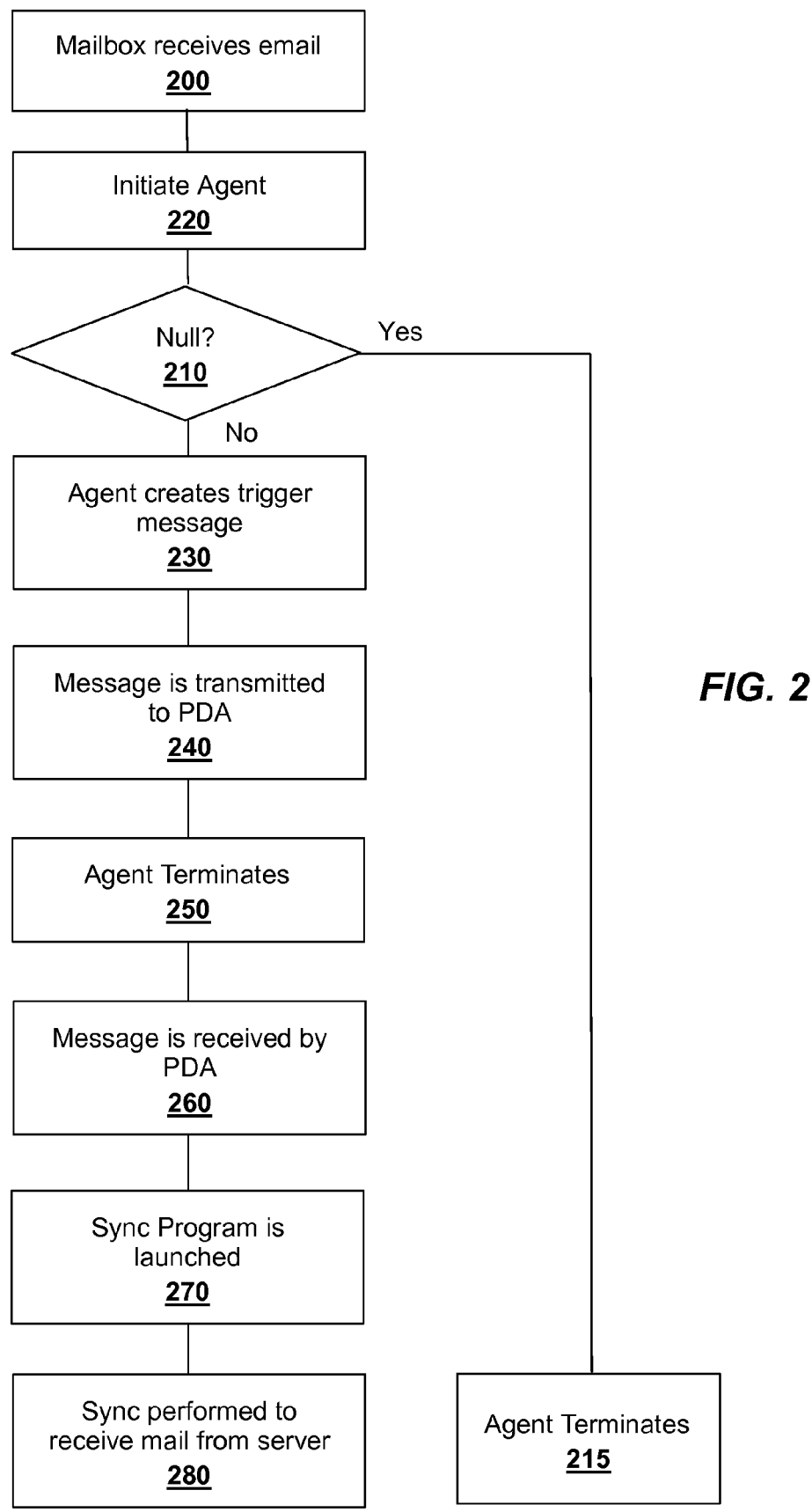
FIG. 2 illustrates at a high level the operation of a preferred embodiment of the present invention.

FIG. 2 illustrates at a high level the operation of the invention according to a preferred embodiment and should be read in conjunction with FIG. 1.

Mailbox 40 receives email 45 (step 200) and this causes the agent 50 to be initiated (step 210). If the remote device field associated with the mailbox 40 is null (ie nothing specified) then the agent terminates (step 215). Otherwise the agent creates a trigger message 60 (step 230) which is transmitted to the corresponding PDA at step 240. The agent then terminates (step 250). The receipt of the trigger message at the PDA (step 260) causes the synchronisation program 110 to launch (step 270) (if not already running). Synchronisation is then performed, resulting in a copy of the mail from the server being received by the client (step 280).

Figure 3A:
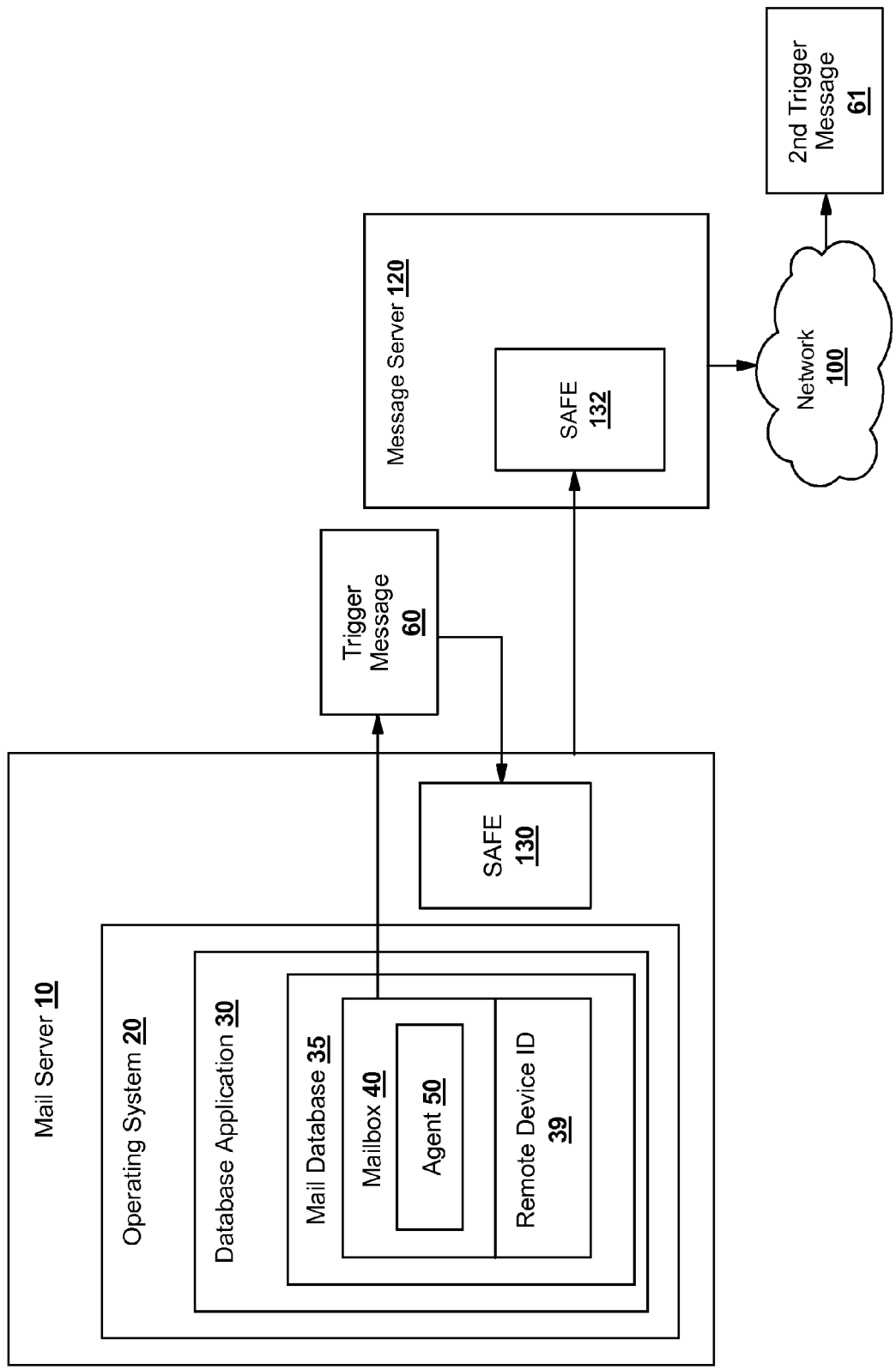
FIG. 3a shows in more detail a preferred embodiment of the server-end of FIG. 1.

FIG. 3a shows in more detail a preferred embodiment of the server-end of FIG. 1. The server is split into two components, a mail server 10 and a message server 120. These may be physically on the same machine or on separate machines with an appropriate network link between them. The mail server 10 has already been described with reference to FIG. 1, however this time the field including a remote device id 39 is also shown for mailbox 40. As previously described, agent 50 is activated upon receipt of an incoming message to mailbox 40, and assuming that remote device id field 39 is not blank, the agent creates and passes, via SAFE 130 and 132, a trigger message 60 to the message server 120. The trigger message includes remote device id 39.

The message server 120 is responsible for routing a second trigger message 61 across network 100 to the PDA corresponding to the user mailbox (shown in FIG. 1). The server 120 also runs a SAFE application.

Figure 3B:
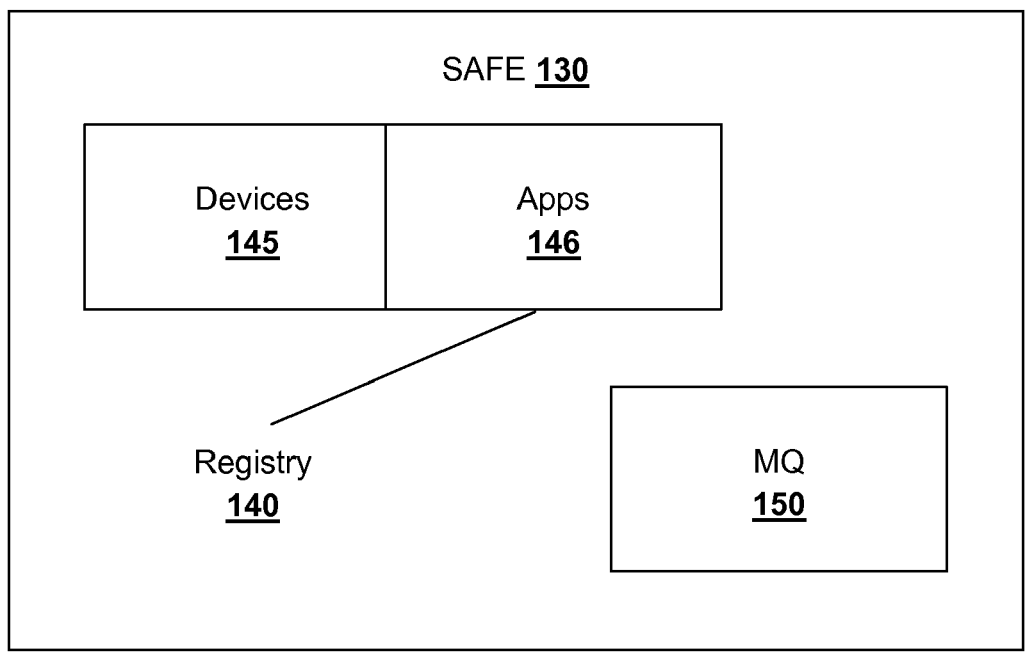
FIG. 3b shows the SAFE application in more detail.

FIG. 3b shows the SAFE application in more detail and should be read in conjunction with FIG. 3a and FIGS. 4 to 6. The SAFE applications 131 and 132 operate in a similar manner as 130. The SAFE 130 application maintains a registry 140, which stores two sets of data, the first relating to devices and the second relating to applications. When an application is executed on a machine running the SAFE application, it registers itself with the application part 146 of the registry. When an application on a machine requests SAFE to deliver a message, the SAFE application first checks whether it recognizes the device to which the message is addressed. If not the message is automatically sent to the SAFE application designated "HOME" which in the present embodiment is SAFE 132 running on the message server. The HOME SAFE application essentially provides a centralised routing facility for SAFE messages from the other systems.

A device (eg a PDA) with network connectivity enabled via, for example, a dialup modem connection can register itself with the devices portion 145 of the HOME registry 140. A PDA user can specify contact details (eg the telephone number of the PDA) as part of a configuration on the remote device (not shown) and then the first time the device dials in to the message server this information is transferred across to the server's registry. This HOME registry maps the PDA's device id to the corresponding contact details. It is also possible using the PDA to remove the device id from the HOME registry 140. SAFE applications running on machines other than the HOME system need only store device information to allow them to contact their HOME system as required.

A message queuing (MQ) application 150 (see FIG. 3b) also runs within SAFE on the message server 120 and according to the preferred embodiment this is the MQ Series application, available from the IBM Corporation. The MQ application provides reliable delivery of messages from a SAFE application on one machine to a SAFE application on another machine. When a message is transmitted using the MQ application, a copy of it sits on a queue (not shown) until confirmation of receipt is received from the device to which it has been sent. The application therefore ensures reliable delivery of messages. Furthermore the MQ application may also have encryption and compression capabilities etc.

Figure 4:
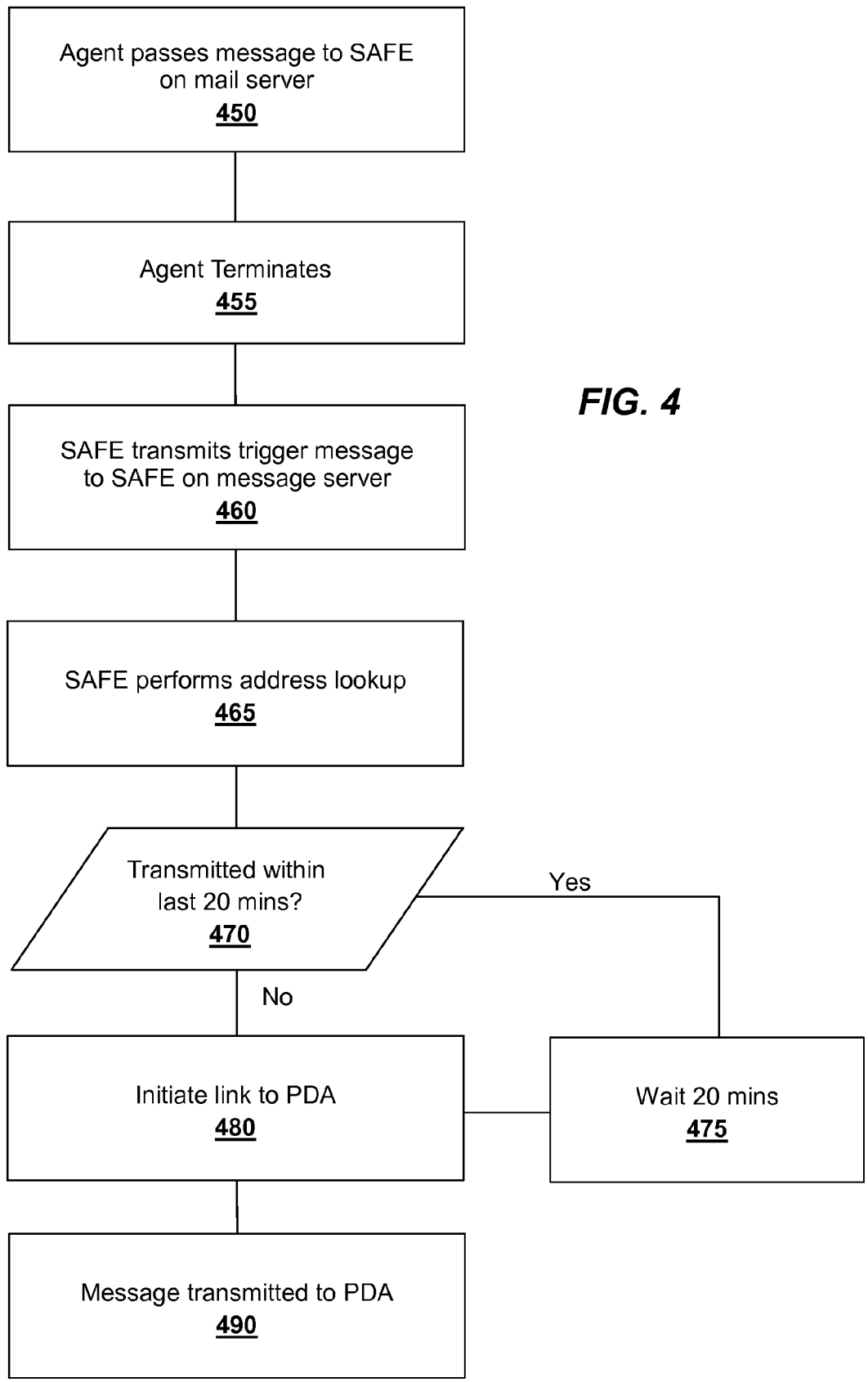
FIG. 4 depicts the operation at the server-end of FIG. 3a according to one embodiment of the present invention.

The operation at the server-end of FIG. 3a is shown in FIG. 4, according to one embodiment of the present invention, which should be read in conjunction with FIGS. 3a and 3b.

Agent 50 passes the trigger message 60 including the remote device id to the SAFE application 130, running on the mail server (step 450) and then terminates at step 455. SAFE 130 determines that it is not the device to which the message is addressed and therefore transmits the trigger message 60 to the HOME SAFE application 132 running on the message server 120 (step 460). Note, the trigger message contains a request to perform mail synchronisation The HOME SAFE application 132, looks up the address (ie typically a telephone number) of the device id in the devices portion 145 of the HOME registry 140 (step 470). A timer also runs on the message server (not shown in FIG. 3a). This is used at step 470 to check when the message server last called the remote computing device. According to the preferred embodiment, if it did so within a configurable time period, then the message server waits until the expiry of such time period (stop 475) before initiating a link at step 480 with the PDA. Note, this setting can be performed in similar fashion to the configuration of the device ID described earlier and in the example the aforementioned time period is 20 minutes.

Otherwise, a link is initiated immediately. This link is based on the contact information retrieved from the HOME registry at step 465. Note, if the device id is not found then this can be logged and the whole process terminated.

Thus, the PDA device can send messages to the server 10 in order to update the device id 39 and timer setting. The PDA transmits such a message by dialing into the server. As previously mentioned, it can also disable the service altogether by transmitting a null device id 39.

In order to initiate the link from the message server 120 to the PDA 70, a second trigger message 161 containing the keyword "SAFE" is transmitted to the SAFE application 131, running on the PDA. As described in more detail below, the initial link is then dropped and a second link formed from the PDA back to the message server. This allows a second connection to be formed between the SAFE applications running on both the message server and the PDA. The message server then uses the MQ application to transmit the synchronisation request, via the SAFE application, to the PDA at step 490.

The reason for this approach is that as described in more detail below, communications capabilities are limited on a PDA. In particular, the PDA can only setup TCP/IP communications as used by MQ for outbound calls. In contrast, for inbound calls only a simple serial protocol is supported. Therefore the MQ application is not actually used for initial delivery of the second trigger message from the message server to the PDA. Rather, this is transmitted to the PDA by the SAFE application itself using the basic serial protocol. Since the second trigger message contains simply the keyword "SAFE", and given the further processing described below, the absence of complete reliability in terms of delivery of the second trigger message is not significant.

Figure 5:
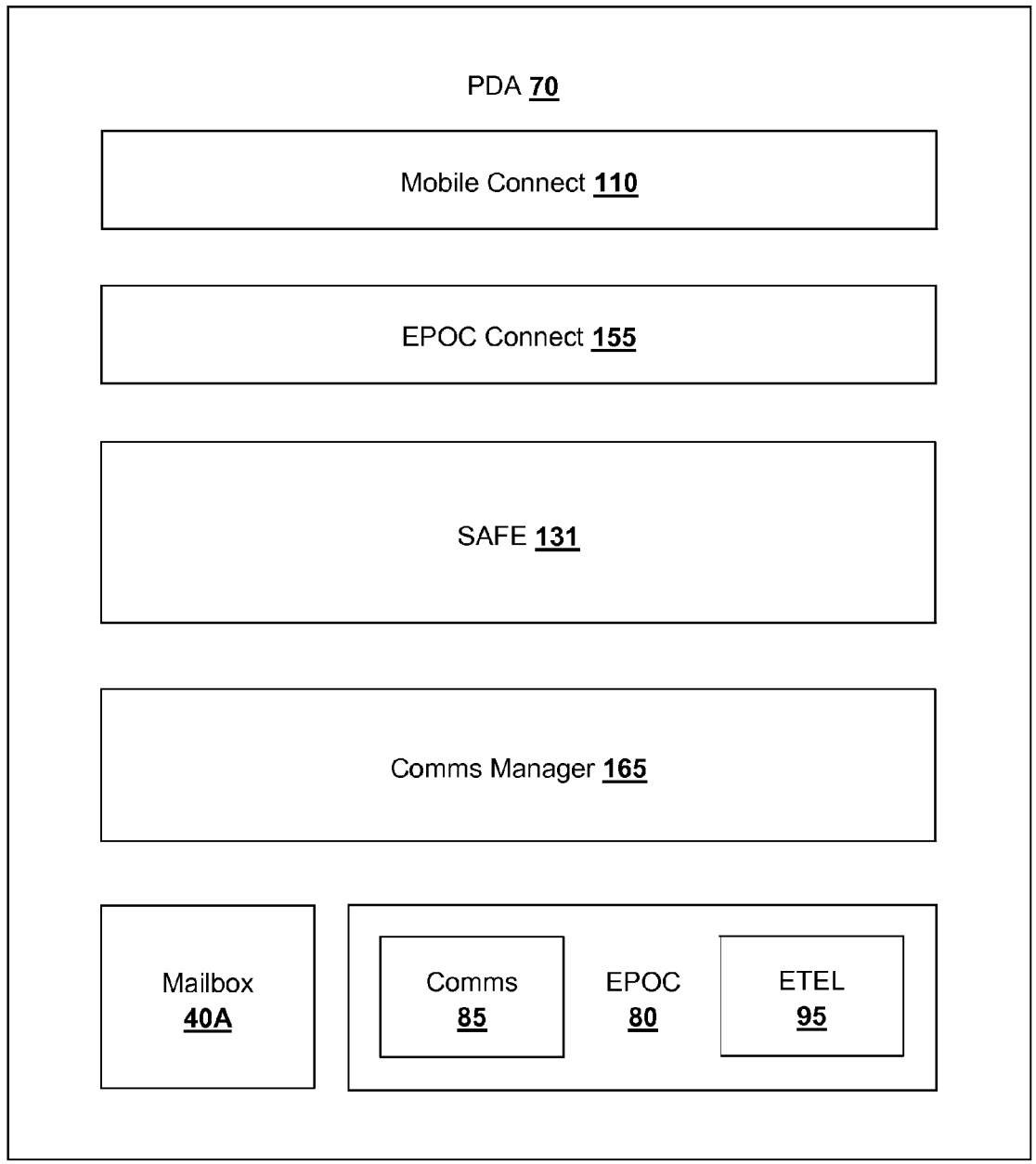
FIG. 5 is a component diagram of the software running on a personal digital assistant (PDA) in accordance with a preferred embodiment of the present invention.

FIG. 5 is a component diagram of the software running on a PDA 70 in accordance with a preferred embodiment of the present invention. The PDA runs the EPOC operating system 80 which includes an ETEL component 95. The ETEL software is responsible for detecting an incoming call, for answering it, and for determining whether the call is voice, FAX, or data.

Also within the operating system sits Comms software 85. When an incoming call from the message server is received responsive to step 480 in FIG. 4, this establishes a serial data connection between the Comms software and the HOME SAFE application 132. The Comms software is responsible for receiving data over this connection including the second trigger message, which it then passes to Comms Manager 165. Comms Manager identifies the second trigger message by means of the keyword "SAFE" and notifies a SAFE application 131, running on the PDA. The call is then dropped at the SAFE application 131 initiates a second call back to the HOME SAFE application 132 on the message server. Because this is an outbound call, the SAFE applications can now set up a TCP/IP link and talk to each other using MQ.

The PDA also runs mail software for receiving, sending, working with emails etc (shown in FIG. 1). This is provided with the operating system 80 and includes mailbox 40A. Given the resource constraints on PDA 70, it does not make sense to also install a separate mail program to act as a client to the mail server database 35, complete with local mailbox replica. Rather, the PDA includes the Mobile Connect application, available from the IBM Corporation, which allows the operating system mailbox 40A on PDA 70 to effectively function as a replica of mailbox 40 on mail server 10. Thus Mobile Connect can be used to perform "synchronisation" between mailbox 40A on PDA 70 and mailbox 40, in which case Mobile Connect performs any necessary format conversion, as well as truncating mail from the server if it exceeds a predetermined size due to. storage limitations on PDA 70. In this manner mailbox 40A on PDA 70 appears to the user as a local replica of mailbox 40 on mail server 10.

Once the second connection has been established, the message server 120 sends a synchronisation request to the PDA. This is then passed to Comms Manager which notifies the SAFE application 131, running on the PDA. The SAFE application 131 again includes a MQ application and a registry (as shown in FIG. 3b). The SAFE application verifies, via its registry, whether a Mobile Connect (MC) program 110 is running and if not it launches this program.

Once it is confirmed that the Mobile Client is running or has been launched, the SAFE application notifies the incoming message to EPOC Connect 155, which in turn causes EPOC Connect to pass a command to Mobile Connect prompting it to set up a communications link with the mail server in order to perform mail database synchronisation. Such synchronisation is part of the standard known operation of Mobile Connect and accordingly will not be described further here. Note, EPOC Connect and Comms Manager are essentially part of the overall SAFE application but are platform dependent, and so are separate processes in order to allow the main SAFE application 131 to retain platform independence.

Figure 6:
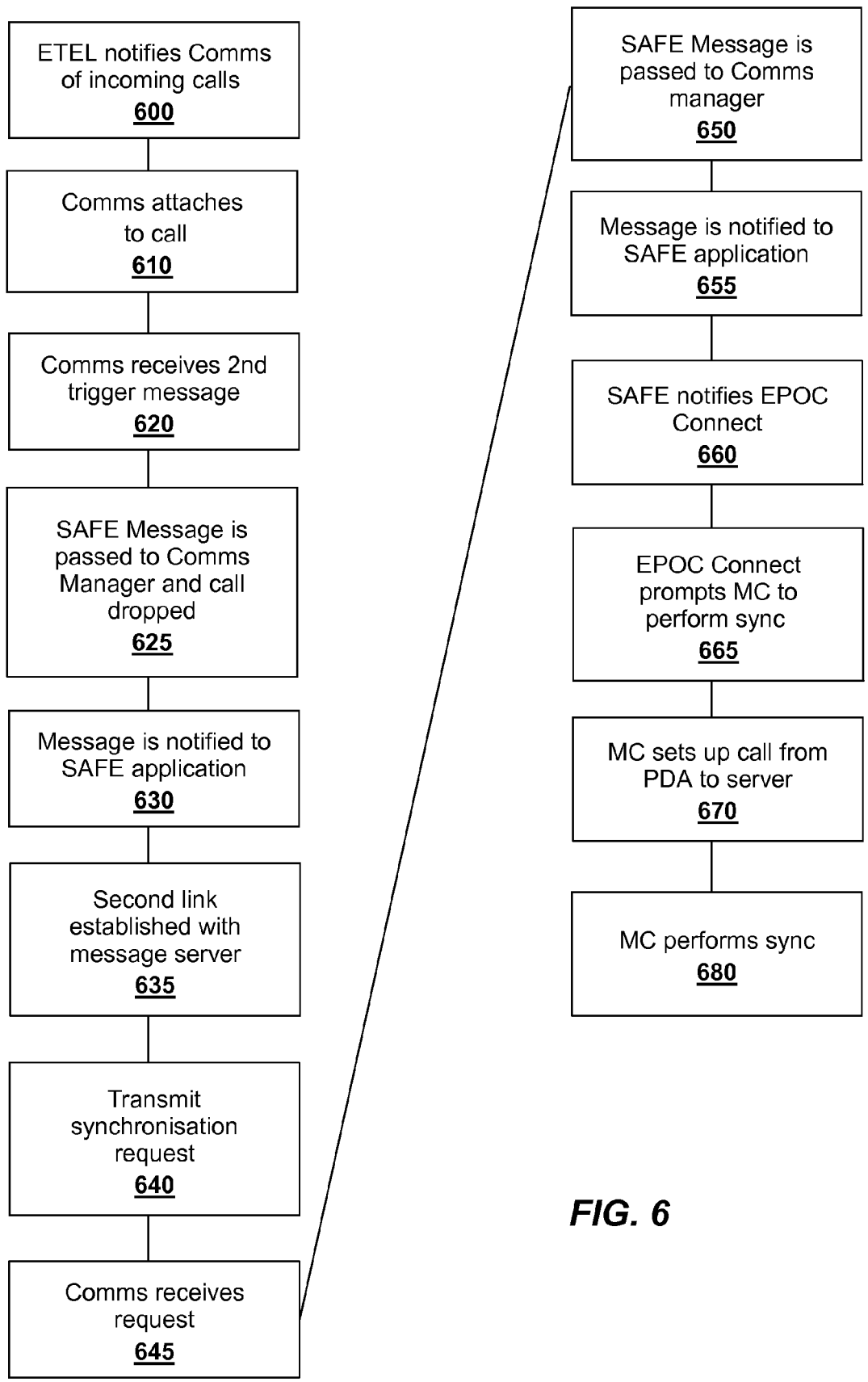
FIG. 6 illustrates the operation of the PDA upon receipt of a second trigger message.

FIG. 6 illustrates the operation of the PDA upon receipt of the second trigger message (corresponding essentially to steps 260–280 in FIG. 2). According to the preferred embodiment, the message server 120 initiates a call to the PDA 70. ETEL 95 detects an incoming call (not shown) and if this is a data call (as opposed to voice or FAX) it notifies Comms 85 (step 600). Comms then attaches to the call (step 610) and is then responsible for receiving the "SAFE" second trigger message 61 (step 620). The second trigger message is then passed to Comms Manager 165 which identifies the "SAFE" keyword and the call is dropped (step 625). Note, if the second trigger message is not received within a given period of time then the call is also dropped.

The Comms Manager then notifies the SAFE application that the second trigger message has been received (step 630), and SAFE initiates a second call to the message server to establish a second link (step 635). The original synchronisation request 60 from the mail database is then transmitted by the message server to the PDA (this time using the MQ application) over this second link (step 640). The Comms software receives This (step 645) and passes it to Comms Manager (step 650). The message is notified to the SAFE application (step 655) which checks whether Mobile Connect is running using its registry and if not Mobile Connect is launched. SAFE then passes a command to EPOC Connect at step 660, which prompts it to request Mobile Connect to perform mail database synchronisation at step 665. Mobile Connect sets up a call from the PDA to the server 10 (step 670) and completes the synchronisation process in known fashion (step 680). The overall outcome of this is that the new message that arrived in user mailbox 40 on the mail server has now been transferred to the local copy of the mailbox on PDA 70.

The skilled person will be aware that many variations and enhancements to the above processing are possible, of which an exemplary selection will now be described.

Although the preferred embodiment has been described in terms of two separate servers (ie a mail server and a message server), this configuration is for convenience only. In an alternative embodiment the functionality of the message server may be included in the agent program on the mail server. In other words, the agent program itself would directly set up the link to the PDA, without using the message server as an intermediary. The advantage of the preferred embodiment however is that the message server in fact provides a generic mechanism for contacting the PDA which can then be used for tasks other than mailbox synchronisation.

It will also be appreciated that the messaging structure of the preferred embodiment (ie the use of the first and second trigger messages followed by the synchronisation request) is determined firstly by communications limitations of the PDA, and secondly by a desire to use existing software, especially the MQ Series and Mobile Connect applications. However many variations are possible. For example, some mobile devices may accept TCP/IP communications on an inbound call in which case only the first initial link would need to be established. Alternatively, it might be possible to perform the synchronisation itself over a serial link, so that again only the first initial link would be needed.

It will further be appreciated that the second trigger message could be used to trigger synchronisation directly rather than waiting for the subsequent synchronisation request. The reason for having a separate synchronisation request is that it allows (in principle) other forms of request to be sent, and so provides a more generic solution.

Although the preferred embodiment uses a specific keyword in the trigger message, there are many other possibilities, such as using caller id from the server Thus if the number of a known server is recognised with respect to an incoming call, then this could cause Comms Manager to prompt Mobile Connect to perform synchronisation with the server. Alternatively, the server might use an SMS message to the PDA to prompt synchronisation. This has the added advantage that such messages will be queued if the PDA is switched off for future delivery. It will be appreciated that both of these approaches are possible independent of whether the mail server contacts the PDA directly, or whether it uses a message server as an intermediary. On the other hand, communication with the client via a basic serial protocol as in the preferred embodiment implies the solution is not limited to a specific infrastructure, unlike GSM SMS messages, and so can work internationally.

Furthermore, although the preferred embodiment has been described in terms of synchronisation with a single mobile computing device, the invention is not limited to such. It is possible to specify multiple device ids in mailbox 40 on mail server 10 and for synchronisation to be initiated with all corresponding remote devices upon receipt of a new mail message.

What is claimed is:

1. A method for performing server initiated database synchronisation between a mail server and a client on a mobile computing device, the method comprising the steps of:

providing the mail server and the client each with a user mailbox, wherein the mail server mailbox includes a remote device id for identifying the client;

receiving a message for said user at said mail server;

storing the message in said user mailbox on said mail server;

responsive to receipt of said message at the mail server, initiating a link between said mail server and said client using said remote device id, and wherein the step of initiating the link comprises:

creating a first trigger message, transmitting said trigger message to a message server, at the message server, transmitting a second trigger message to the client using a first protocol responsive to receipt of the first trigger message, at the client, initiating a client mailbox synchronise request to the mail server using a second protocol in response to the receipt of the second trigger message; and synchronising the client mailbox with the mail server mailbox using the second protocol such that said message is added to the client mailbox.

2. The method of claim 1, wherein the mail server mailbox includes the remote device id for identifying the client.

3. The method of claim 2, wherein the step of initiating a link to said client comprises executing an agent, wherein the agent initiates a call to the client using said remote device id.

4. The method of claim 3, wherein the agent initiates the call to the client by:

creating the first trigger message, said first trigger message comprising the remote device id;

transmitting said first trigger message to the message server; and responsive to receipt of said first trigger message at the message server, initiating said link between the mail server and the client in order to perform said synchronisation.

5. The method of claim 4, wherein said message server includes an address book, in which the remote device id of the client and contact details are stored.

6. The method of claim 5, wherein the step of initiating a link to the client further comprises:

receiving the first trigger message at said message server;

looking up the remote device id contained within said first trigger message in the message server's address book;

mapping said remote device id to the corresponding contact details; and using said details to transmit the second trigger message to the client.

7. The method of claim 6 wherein a first link is established between the client and the message server to allow receipt of said second trigger message by the client, said method further comprising the steps of:

dropping said first link after receipt of said second trigger message at the client;

initiating a second link from the client to the message server; and transmitting a synchronisation request over said second link from the message server to the client using the second protocol, wherein said synchronisation is performed in response to receipt of said request at the client.

8. The method of claim 6, wherein the second trigger message is an SMS text message.

9. The method of claim 4, wherein the mail server and the message server are physically the same machine.

10. The method of claim 1, further comprising the step of allowing a user to disable server initiated database synchronisation with the client.

11. The method of claim 1, comprising the steps of:
logging when synchronisation was last performed; and
responsive to receipt of a new message for the user at the mail server, waiting a predetermined amount of time after said synchronisation was last performed before performing synchronisation again.

12. The method of claim 11, further comprising the step of enabling a user to alter said predetermined amount of time.

13. A mail server for initiating database synchronisation with a client on a mobile computing device, comprising:
a mail server copy of a user mailbox, wherein a copy of said user mailbox also exists on the client;
means for receiving a message for said user at the mail server;
means for storing the message in said user mailbox on the mail server;
means, responsive to receipt of said message at the mail server, for initiating a link between the mail server and the client; and
means for transmitting synchronisation updates to the client in order to synchronise the client copy of said mailbox with the mail server copy, such that said message is added to the client copy of the mailbox, wherein the means for initiating the link comprises:
creating a first trigger message,
transmitting said trigger message to a message server,
at the message server, transmitting a second trigger message to the client using a first protocol responsive to receipt of the first trigger message,
at the client, initiating a client mailbox synchronise request to the mail server using a second protocol in response to the receipt of the second trigger message; and
synchronising the client mailbox with the mail server mailbox using the second protocol such that said message is added to the client mailbox.

14. The mail server of claim 13, wherein the mail server copy of the mailbox includes a remote device id for identifying the client.

15. The mail server of claim 14, wherein the means for initiating a link to said client comprises an agent which initiates a call to the client using said remote device id.

16. The mail server of claim 15, wherein the mail server further includes a message server, and wherein the agent initiates the call to the client by creating the first trigger message, said first trigger message including the remote device id, and by transmitting said first trigger message to the message server, said message server including means responsive to receipt of said first trigger message for initiating said link between the mail server and the client in order to perform said synchronisation.

17. The mail server of claim 16, wherein said message server includes an address book, in which the remote device id of the client and contact details are stored.

18. The mail server of claim 17, wherein the message server further comprises:
means for receiving the first trigger message;
means for looking up the remote device id contained within said first trigger message in the message server's address book;
means for mapping said remote device id to the corresponding contact details; and
means for using said details to transmit the second trigger message to the client.

19. The mail server of claim 18, wherein the second trigger message is an SMS text message.

20. The mail server of claim 13, further comprising means for allowing a user to disable server initiated database synchronisation with the client.

21. The mail server of claim 13, further comprising:
a log of when synchronisation was last performed; and
means responsive to receipt of a new message for the user at the mail server, for waiting a predetermined amount of time after synchronisation was last performed before performing synchronisation again.

22. The mail server of claim 21, further comprising means for enabling a user to alter said predetermined amount of time.

* * * * *

UNITED STATES PATENT AND TRADEMARK OFFICE
CERTIFICATE OF CORRECTION

PATENT NO. : 7,191,218 B1 Page 1 of 1
APPLICATION NO. : 09/613407
DATED : March 13, 2007
INVENTOR(S) : Innes It is certified that error appears in the above-identified patent and that said Letters Patent is hereby corrected as shown below:

Col. 7, line 3: after "registry 140", delete "(step 470)" and insert -- (step 465) --

Col. 7, line 9: after "time period", delete "(stop 475)" and insert -- (step 475) --

Col. 7, line 25: after "trigger message", delete "161" and insert -- 61 --

Col. 7, line 66: delete "dropped at" and insert -- dropped and --

Col. 8, line 18: after "due to", delete "."

Col. 8, line 62: after "software receives", delete "This" and insert -- this request --

Signed and Sealed this

Eighth Day of July, 2008

JON W. DUDAS
*Director of the United States Patent and Trademark Office*